(12) United States Patent
Smiljanic

(10) Patent No.: US 7,623,525 B2
(45) Date of Patent: Nov. 24, 2009

(54) FLEXIBLE MULTICASTING IN HIGH-CAPACITY SWITCHES

(75) Inventor: Aleksandra Smiljanic, Atlantic Highlands, NJ (US)

(73) Assignee: AT&T Corp., New York, NY (US)

( * ) Notice: Subject to any disclaimer, the term of this patent is extended or adjusted under 35 U.S.C. 154(b) by 198 days.

(21) Appl. No.: 11/930,284

(22) Filed: Oct. 31, 2007

(65) Prior Publication Data

US 2008/0056275 A1    Mar. 6, 2008

Related U.S. Application Data

(62) Division of application No. 10/197,285, filed on Jul. 16, 2002.

(60) Provisional application No. 60/305,922, filed on Jul. 17, 2001, provisional application No. 60/339,681, filed on Dec. 12, 2001.

(51) Int. Cl.
*H04L 12/28* (2006.01)
*H04L 12/56* (2006.01)

(52) U.S. Cl. ............... 370/395.41; 370/412; 370/413; 370/468

(58) Field of Classification Search ............ 370/395.41, 370/412, 413, 468
See application file for complete search history.

(56) References Cited

U.S. PATENT DOCUMENTS

| | | | |
|---|---|---|---|
| 5,602,829 A * | 2/1997 | Nie et al. | 370/235 |
| 5,631,908 A | 5/1997 | Saxe | |
| 6,201,793 B1 * | 3/2001 | Chen et al. | 370/238 |
| 6,442,135 B1 | 8/2002 | Ofek | |
| 6,618,379 B1 * | 9/2003 | Ramamurthy et al. | 370/395.41 |
| 7,194,549 B1 | 3/2007 | Lee et al. | |
| 2002/0044568 A1 * | 4/2002 | Smiljanic | 370/468 |
| 2002/0122428 A1 * | 9/2002 | Fan et al. | 370/395.4 |
| 2003/0031193 A1 | 2/2003 | Andrews et al. | |
| 2005/0232272 A1 | 10/2005 | Deng | |
| 2006/0034246 A1 * | 2/2006 | Smiljanic | 370/348 |

OTHER PUBLICATIONS

Dr. Aleksandra Smiljanic, "Flexible Bandwidth Allocation in Terabit Packet Switches," Proceedings of IEEE Conference in High Performance Switching and Routing, Jun. 2000, pp. 233-239.

* cited by examiner

*Primary Examiner*—Kevin C Harper
*Assistant Examiner*—Wanda Z Russell

(57) ABSTRACT

In a communication system using multicasting, multicast packets are forwarded through a switch by destination ports after these ports receive the packets. A source node sends the multicast packet to a subset of nodes within the multicast group, which in turn, forward the multicast packet to other subsets of packets within the multicast group that have yet to receive the information. This is continued until all ports within the multicast group have received the information.

6 Claims, 6 Drawing Sheets

US 7,623,525 B2

FLEXIBLE MULTICASTING IN HIGH-CAPACITY SWITCHES

CROSS-REFERENCE TO RELATED APPLICATIONS

This application is a divisional application of U.S. Ser. No. 10/197,285, entitled Flexible Multicasting in High-Capacity Switches, filed Jul. 16, 2002 and claims priority to U.S. Provisional Patent Application No. 60/305,922, entitled "Flexible Bandwidth Allocation In High-Capacity Switches with Multicasting" filed on Jul. 17, 2001; and U.S. Provisional Patent Application No. 60/339,681, entitled: Flexible Multicasting in High-Capacity Switches," filed on Dec. 12, 2001. The entirety of each of the above referenced applications is incorporated herein by reference.

FIELD

The present invention relates generally to communication systems and more particularly to communication systems with multicast traffic.

BACKGROUND

As the Internet grows, high-capacity switches are needed. Also, the networks should be more efficiently utilized, and better quality of service (QoS) should be provided to users. For these reasons, explicit routing with bandwidth reservations and delay guarantees have been supported with frameworks such as RSVP and MPLS. Since applications on the Internet have a wide range of bandwidth requirements and holding times, high-capacity packet switches should be designed to support agile bandwidth reservations with fine granularity.

The appeal of the Internet lies in the variety of services and content that it provides. Typically large numbers of users on the Internet wish to access the same information. Consequently, a significant amount of traffic on the Internet is multicast in nature, i.e., the traffic is transmitted from a single source port to multiple destination ports within a multicast group. The source node of a multicast group usually sends a copied multicast packet separately to all destinations within the multicast group. This operation places a significant burden on the source node and the links close to that node. This can create congestion which slows the network.

In an alternative arrangement, multicast packets would be sent along precalculated multicast trees. Here, a packet is copied at branch nodes of the tree, so the transmission load is distributed over those nodes. Links closer to the source carry less traffic as a result. One issue with this arrangement is that the signaling and processing required to calculate these multicast trees is burdensome in a wide area network having a large number of nodes and edges. Assuming that the Internet growth has an upper bound, high-capacity switches would significantly reduce the number of nodes and edges in the network, and so more readily provide quality of service in wide area network. However, the processing bottleneck is moved from the source to the switch in this design.

It has further been recognized that large switches with input buffers do not well support multicasting of popular contents with large fan-outs (numbers of destinations). For example, it is well known that a three-stage Clos switch requires speed-up equal to the maximum fan-out to ensure strict non-blocking. It has also been shown that the non-blocking condition in a cell-based switch with input buffers is equalized to that in a three-stage Clos circuit switch. So, a switch with a moderate speed-up would not carry a popular multicast session properly. In addition, users attached to the port that multicasts some popular content would be clogged.

Therefore a need exists for an improved system for transmitting data in multicast systems that avoids problems such as the source node being over-burdened and slow network traffic that would be due to bottlenecks at the source node.

SUMMARY OF THE INVENTION

Within a communication system using multicasting, multicast packets are forwarded through a switch by destination ports after these ports receive the packets. The source node sends the multicast packet to a subset of nodes within the multicast group. Those nodes, in turn, forward the multicast packet to other subsets of nodes within the multicast group that have yet to receive the information. This is continued until all destination ports within the multicast group have received the information.

DETAILED DESCRIPTION

Overview

In an exemplary embodiment of the present invention, within a multicast group, the source port is relieved of some of its burden by providing that some destination ports within the group be responsible for forwarding received packets of information.

Figure 1:
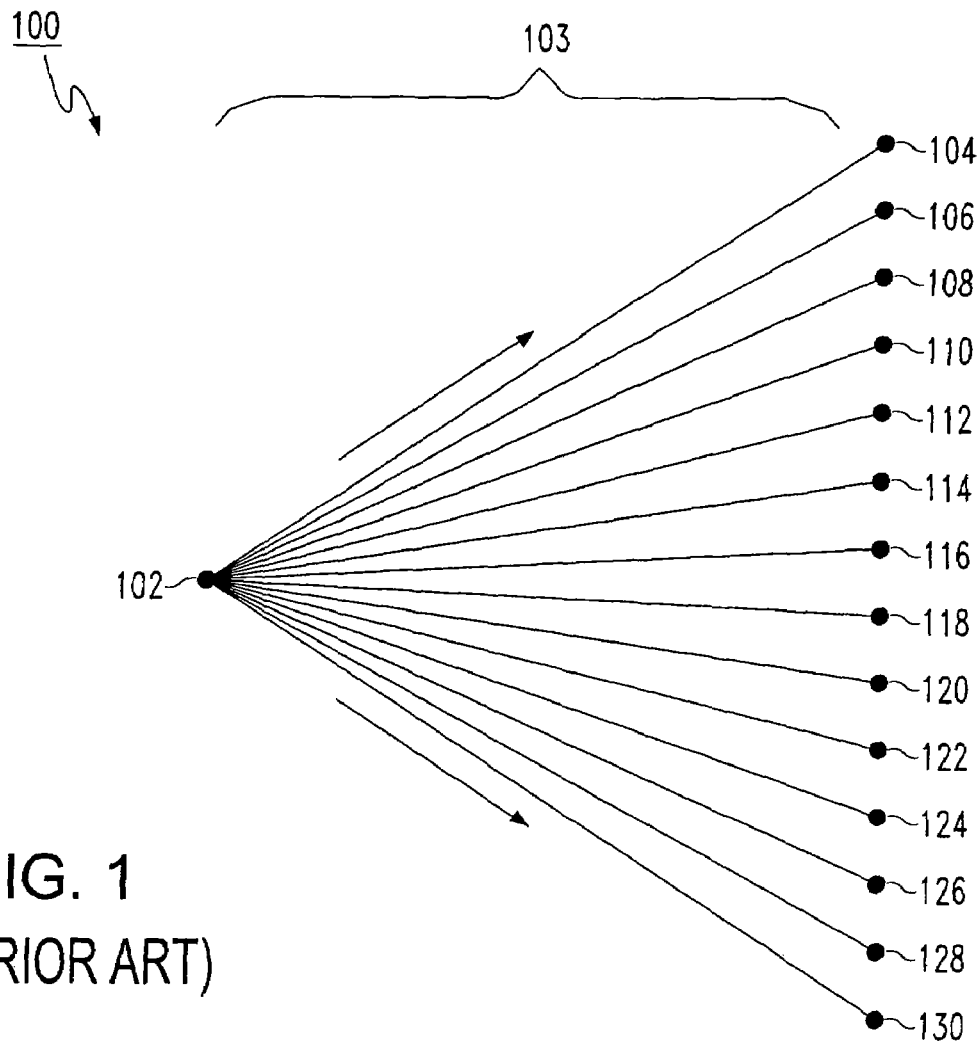
FIG. 1 depicts a prior art notion of multicasting.

FIG. 1 illustrates distributing information packets in a multicast group 100 according to known systems. A source port 102 sends a copy of the information packets to each port within the multicast group 100 along respective connection paths 103 for each port. This places a great deal of pressure or burden on source port 102 because it alone must bear the task of distributing separate copies of information packets to each member of the entire multicast group.

Figure 2:
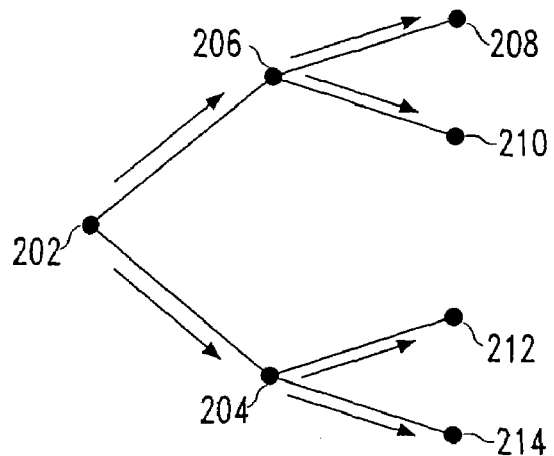
FIG. 2 illustrates an example embodiment in accordance with an aspect of the present invention.

FIG. 2 illustrates an example embodiment of the proposed invention. FIG. 2 includes a multicast group 200, a source node 202, and destination nodes 204, 206, 208, 210, 212, 214. The source and destination nodes represent any communication mechanisms that can send and receive communication signals including, but not limited to, input and output ports of large-capacity switches.

In operation, source node 202 receives a packet of information and, rather than forward the information to each destination node individually as in FIG. 1, source node 202 transmits the information packet to only a subset of destination nodes, in this example destination nodes 204 and 206. Destination nodes 204 and 206 each receive the information packet and in turn each transmits the information packet to other destination nodes within multicast group 200. Specifically, destination node 204 forwards the information packet to destination nodes 212 and 214, and destination node 206 forwards the information packet to destination nodes 208 and 210. Those of skill in the art will understand that multicast group 200 may include greater or fewer destination nodes and that each forwarding node may forward information to greater or fewer destination nodes than shown in this example.

When a multicast session is initiated, it will be assigned a label. As ports join the session, or leave the session, the order for forwarding is being updated as described in this application. When some port in the multicast group receives the packet, the port reads the packet label and determines from its forwarding table to which ports it should forward this packet. In one example of a packet label, a first part of the label includes the address of a port that sources the multicast session in question, and a second part of the label is the session number. In this way, a label can be assigned to the session at its sourcing port, and not at the centralized controller.

The following description will suggest an implementation for achieving this multicast functionality. First, certain principles derived from a unicast arrangement are described. Then the description refers to how those principles might be exploited in a multicast environment. Finally, the new multicast protocol is extended to provide reliable switching of multicast traffic in the case of port failure.

Figure 3:
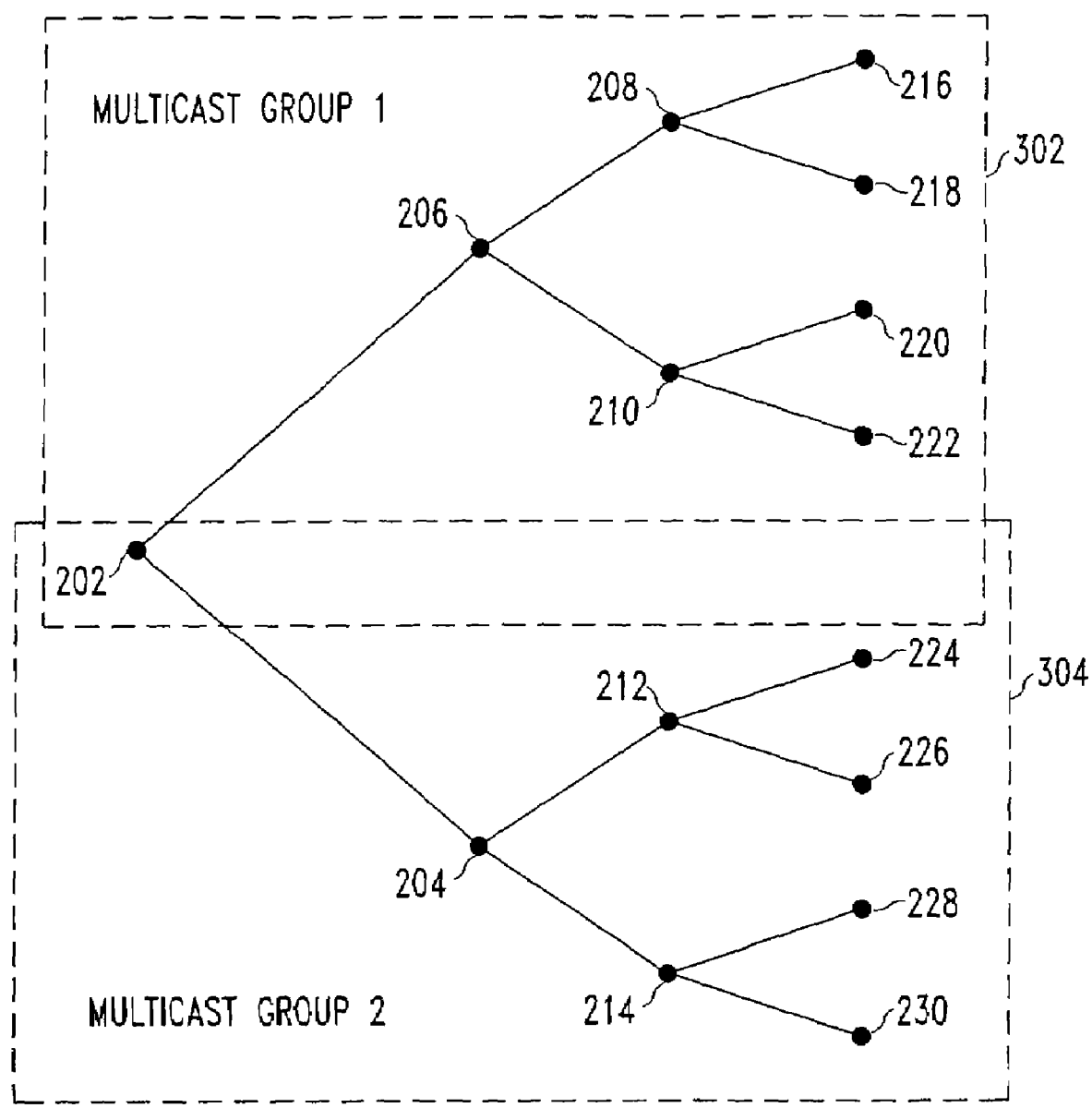
FIG. 3 is a schematic representation of two multicast groups.

Scalable Scheduling Protocol and Agile Admission Control Protocol in the Case of Unicast Traffic It is known to provide protocols for transmission of unicast traffic in a switch with input buffers. In fact, packets of information are typically scheduled before they are transmitted in this environment. One known approach is sequential greedy scheduling (SGS) based on credits. This technique was described by the inventor in an article entitled "Flexible bandwidth allocation in terabit capacity switches", *Proceedings of IEEE Conference in High Performance Switching and Routing*, June 2000, pp. 233-241, the disclosure of which is hereby incorporated by reference. This approach is described herein for the sake of completeness. Inputs choose outputs one after another in a pipeline fashion. Namely, a schedule for a given one time slot is calculated in multiple time slots earlier in time. In addition, multiple schedules are calculated in each time slot. Here, a time slot schedule refers to the set of input-output pairs to be connected in a given time slot, so that inputs in question transmit packets to outputs to which they are connected. FIG. 3 shows a time slot diagram 400 for pipelining where, in each time slot 402($a$-$l$)(labeled $T_1$-$T_{12}$), only one input (I) selects an output for a particular time slot in the future. If the notation $I_i \rightarrow T_k$ is assigned to some time slot $T_j$, it means that input $I_i$ reserves an output for time slot $T_k$, and this reservation is made during time slot $T_j$. For example, looking at time slot $T_3$, input $I_1$ has reserved an output for slot $T_6$, $I_2$ has reserved an output for $T_5$ and $I_3$ has reserved an output for $T_4$. Bold vertical lines enclose the calculation of one schedule, which lasts N time slots (in the given example N=3). For example, looking at the top line the time interval formed by time slots $T_3$, $T_4$ and $T_5$ is bounded by bold vertical lines. This means that over the course of this 3 slot time interval, inputs $I_1$ to $I_3$ reserved or set the schedule for time slot $T_6$. In our description N denotes the number of input and output ports. In the more general case, in any time slot multiple inputs might select outputs for some future time slot, or they might take multiple time slots for inputs to select an output for a future time slot. Time is further divided into frames 404($a$-$b$) comprising a fixed number of time slots F(6 time slots in the example shown in FIG. 3). In the specified time slot of a frame, counters of some input are set to certain negotiated values. In the shown example, input i sets its counters $c_{ij}$ to negotiated values $a_{ij}$, that is $c_{ij}=a_{ij}$, $1 \leq j \leq N$, in time slots $k \cdot F - N + i - 1, k \geq 1$. Only inputs having positive associated counters would compete for service; and whenever a queue is served, its counter is decremented by 1.

After inputs schedule packets from queues with positive counters, they might schedule packets from the remaining queues in the same pipelined fashion. In this way, the best effort traffic can be accommodated if there is some bandwidth left after the higher priority traffic is served. Packets are stored into different queues according to their destinations, so that the information about any queue status (empty or nonempty) and its heading packet is readily obtained. Such input buffer organization is often referred to as a buffer with virtual output queuing (VOQ).

Figure 4:
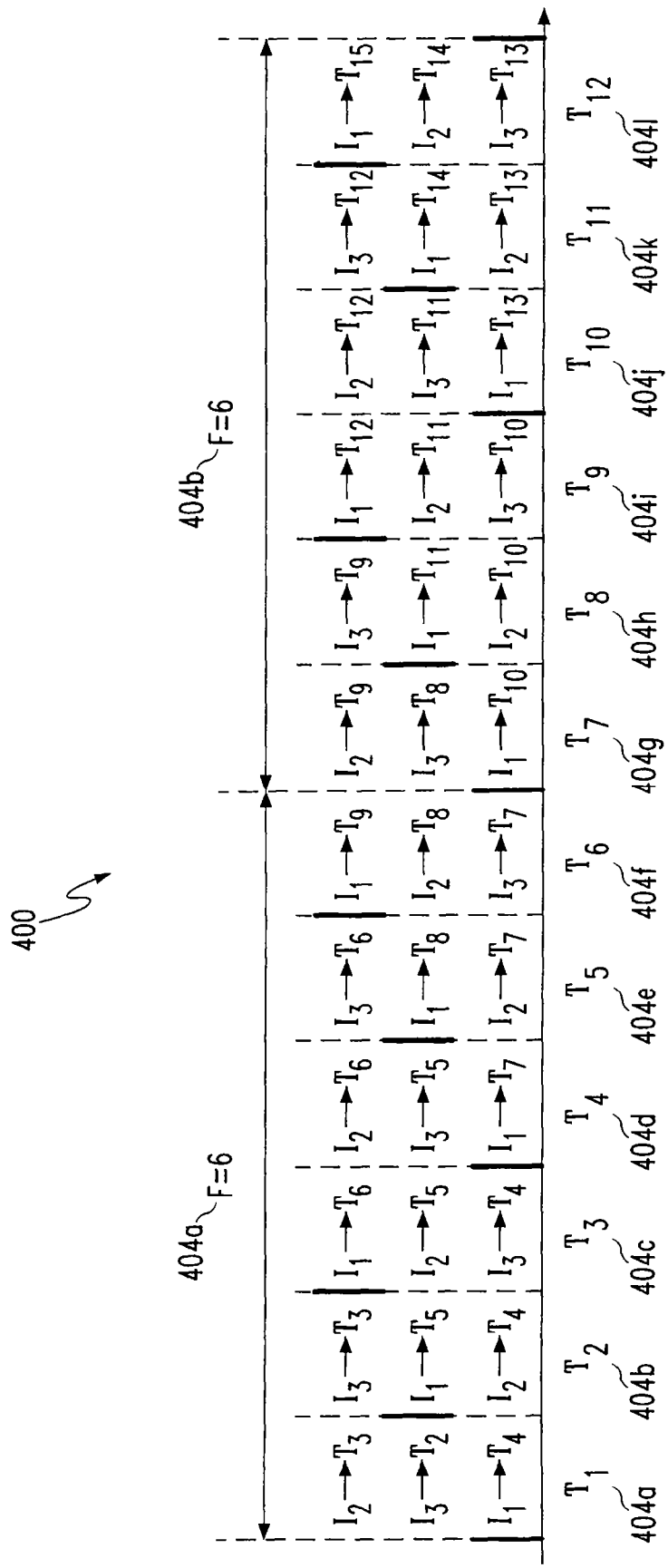
FIG. 4 is a schematic representation of time slot pipelining useful in connection with understanding example embodiments of the present invention.

The pipelined sequential greedy scheduling algorithm is easy to implement, and it scales well with an increasing number of ports and a decreasing packet transmission time. FIG. 4 illustrates an arrangement in which this can be implemented. A plurality of Input Modules (e.g., 502$a$, 502$b$, and 502$c$) each include an input buffer 510, an output selector 520, and an output memory 530. As shown in FIG. 4 the algorithm requires communication only among adjacent input modules and, consequently, a simple scheduler implementation. Also, by using pipelining the requirements on the speed of electronics are relaxed. In addition, the algorithm implies an extremely simple admission control protocol that provides agile bandwidth reservations. When bandwidth $b_{ij}$ is requested by input-output pair (i, j), then credits should be assigned to it on the order of $a_{ij}=|b_{ij} \cdot F/B|$ time slots per frame. We have shown earlier that the bandwidth can be allocated to input-output pair (i, j) if the following condition holds:

$$\sum_{1 \leq k \leq N} a_{ik} + \sum_{1 \leq k \leq N} a_{kj} \leq F + 1. \quad (1)$$

Consequently, the bandwidth can be allocated in a switch if for all $1 \leq i \leq N$ the following conditions hold:

$$T_i = \sum_{1 \leq k \leq N} a_{ik} \leq \frac{F+1}{2}, \quad (2)$$

$$R_i = \sum_{1 \leq k \leq N} a_{ki} \leq \frac{F+1}{2},$$

where $T_i$ is the number of credits assigned to input i for transmission, and $R_i$ is the number of credits assigned to output i for reception. Half of the time slots per frame can be allocated to any input or output, meaning that 50% of the port capacity can be reserved for any unicast traffic pattern.

Simple admission conditions such as suggested by equation (2) allow fast bandwidth reservations in a switch having a large number of ports. Also, neither the scheduling protocol nor the admission control protocol depend on the frame length F. Since the frame length determines the granularity of bandwidth reservations G=B/F, the proposed protocols provide bandwidth reservations with fine granularity.

Performance Analysis of Flexible Multicasting In High-Capacity Switches

If the multicast packet could be scheduled for transmission to multiple destinations in the same time slot, the available bandwidth would depend on the multicast traffic pattern. Consequently, the admission control protocol would be intricate because it must consider the multicast traffic pattern. Also, some high-capacity switching fabrics do not allow the transmission of a packet to multiple destinations at the same time. Alternatively, multicast packets might be independently scheduled for different outputs in the multicast group according to a maximal-matching protocol. Here maximal matching protocol is the one that does not leave an input-output pair unmatched if there is the traffic from the input to be sent to the output. The above-described SGS is an example of a scalable maximal matching protocol. However, if an input sends a multicast packet serially to all designated outputs, its bandwidth will be wasted in multiple transmissions of the same packet. In the worst case, a given input transmits a multicast packet to all N outputs. Let $a_{is}^m$ be the number of time slots per frame assigned to multicast session (i,s) sourced by input i, $M_{is}$ be the set of outputs in this multicast group, $|M_{is}|$ be the number of outputs in set $M_{is}$, and $M_i$ be the number of sessions sourced by input i. Note that for a unicast session $|M_{is}|=1$. It follows from equation (2) that credits can be assigned to some input-output pair (i, j) if:

$$\sum_{1 \leq s \leq M_i} a_{is}^m |M_{is}| + \sum_{\substack{1 \leq k \leq N \\ 1 \leq s \leq M_k \\ j \in M_{ks}}} a_{ks}^m \leq F+1. \quad (3)$$

In the worst case, input i sends packets to all N outputs, $|M_{is}|=N$ where N is the number of ports, and from (3), the transmitting port is underutilized:

$$T_i = \sum_{1 \leq s \leq M_i} a_{is}^m \leq \frac{F+1}{N}. \quad (4)$$

One Nth of the time slots in a frame can be allocated to input i, meaning that only 1/N of the transmitting port capacity can be utilized. Generally, the utilization of the port capacity becomes low when a significant amount of multicast traffic that it transmits has a large fan-out (the number of destinations). The performance degradation is more severe in high-capacity switches with a large number of ports, N.

Figure 5:
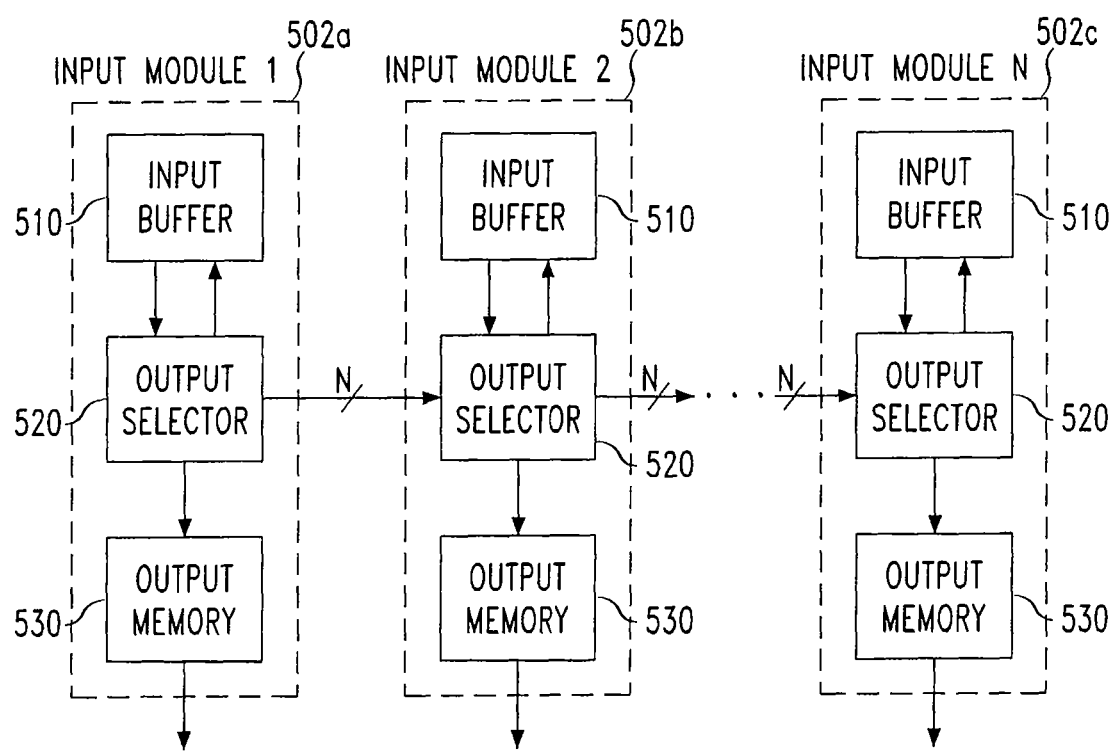
FIG. 5 is a schematic representation of modules useful for implementing a pipelining technique.

Note, however that once any port from the multicast group receives a multicast packet, it can, in accordance with the present invention, forward it to P≧1 ports of that multicast group which have not yet received the packet. Here, then each port comprises both an input and a potential output. In this way, the transmission burden would be balanced over more of the ports in the multicast group. Multicast packets are forwarded in a fixed order. FIG. 5 shows the forwarding mechanism for P=1 in which a port sends a packet to one port and that port forwards it to another.

The figure includes communication ports 602, 604, 606, and 608, packet 610, network switching fabric 612, and buffers 630, 632, 634, and 636. Packet 610 belongs to a multicast session that is transmitted from port 1 602 to port 3 606, which in turn forwards it to port 4 608. Each packet belonging to the multicast session has the same label. We show the position of packet 610 in different instances of time (denoted as 1, 2, 3, and 4). Note that, because of simplicity, this figure shows only the data path (dashed lines) and not the control path used for the schedule calculation and setting up the switching fabric. Packet 610 arrives from network switching fabric 612 to port 1 602. Its label is read from the packet header, and packet destination (port 3) is read from label/destination table. It is then stored in buffer 630 of port 1 602 according to its destination port. After some time, packet 610 is scheduled and then transmitted through the switching fabric 612 to port 3 606, by using e.g., our previously proposed weighted sequential greedy scheduling (WSGS) protocol. The packet label is read from its header, and the next destination (port 4) is determined from label/destination table. Packet 610 is sent to the network through the switching fabric 612 and is also stored in buffer 634 of port 3 for further forwarding. After some time, this packet is scheduled for transmission and then transmitted to port 4 608 via the network switching fabric 612, after which the packet may be further forwarded.

We have seen that for P=N, a multicast packet is transmitted to all outputs within one frame, but the input port might get clogged. On the other side, if each port forwards the packet to only one port, i.e., P=1, then each port uses the small additional capacity for forwarding, but the multicast packet might experience the delay of up to N frames. This delay would become excessive in high-capacity switches with large number of ports N and large frame lengths F. Apparently, there is a tradeoff between the utilized capacity and the packet delay (as usual) that depends on the chosen parameter P, that is, the number of ports to which a given port will forward a packet.

We will analyze the switch capacity that can be guaranteed to the ports in terms of the parameter P. The bandwidth demand and packet forwarding order determine the credit allocation. It follows from equation (2) that credits can be assigned to some input-output pair (i, j) if it holds that:

$$T_i + E_i + R_j \leq F+1, \quad (5)$$

Here, $T_i$ is the total number of time slots per frame reserved for packets that are transmitted by input i, $E_i$ is the number of time slots per frame reserved for input i to forward its multicast packets, and $R_j$ is the number of time slots per frame reserved for packets bound to output i. Condition (5) implies that credits can be assigned to input-output pair (i, j) if:

$$T_i + (P \cdot R_i) + R_j \leq F+1. \quad (6)$$

It further follows that the bandwidth allocation is possible if for all ports i, $1 \leq i \leq N$, it holds that $$T_i \leq F_t,$$

$$R_i \leq F_r,$$

$$F_t + (P+1) \cdot F_r = F+1. \quad (7)$$

The total switching capacity that can be reserved equals:

$$C = N \min(F_t \cdot E[|M|], F_r),$$

where $E[|M|]$ is the average packet fan-out. Parameters $F_t$, $F_r$ are chosen so that the switch capacity is maximized for arbitrary traffic pattern.

$$c = \max_{F_t, F_r E[|M|]} \min(F_t \cdot E[|M|], F_r) = \frac{F+1}{2+P} \quad (8)$$

It is straightforward to see that the maximum capacity in (8) can be reserved for arbitrary traffic when $F_t = F_r = (F+1)/(P+2)$ and, admission conditions are:

$$T_i \leq \frac{F+1}{P+2} \quad (9)$$

$$R_i \leq \frac{F+1}{P+2}$$

for all ports i, $1 \leq i \leq N$.

So the maximum portion of the switch capacity that can be reserved is $1/(P+2)$.

Next, we will calculate the packet delay in terms of the parameter P. Let us assume that a multicast packet of session (i,s) is forwarded to all outputs within S frames. In the first frame, the port that receives the packet from an input forwards it to P ports. In the next frame, each one of these ports forwards the packet to P other multicast ports. In frame k, at least $P^{k-2}$ ports received the multicast packet. In the last frame the packet is sent to at most $P^{S-2}$ remaining ports. It holds that:

$$|M_{is}| > 1 + P + \ldots + P^{s-2} = \frac{P^{s-1}-1}{P-1} \Rightarrow \quad (10)$$

$$s < \log_P((P-1) \cdot |M_{is}| + 1) + 1.$$

For P=2 and N=1024, the maximum packet delay equals S=10 frames. There is an obvious tradeoff between granularity G=B/F and packet delay D=S·F·T, where T is the packet transmission time. If we further assume B=10 Gbps, T=10 ns, and F=$10^4$, granularity of bandwidth reservations is G=1 Mbps, and packet delay is D=5 ms. Since packets would pass through the small number of high-capacity switches, this packet delay could be tolerated even by delay-sensitive applications (for example, voice and video conferencing). Finer granularity can be readily provided to applications which are less sensitive to the delay. For P=2 the portion of the port capacity that can be reserved is 25%, regardless of the traffic pattern. An unfortunate multicast traffic pattern may occur for which the capacity utilized by greedy scheduling algorithms drops below 40% for large switches. So, an admission controller based on scalable scheduling protocols must consider the multicast traffic pattern in order to utilize the larger portion of the switch capacity for more fortunate traffic patterns. However, our proposed protocol implies very simple admission control that only checks port loads in order to allow new bandwidth reservations and still utilizes the significant portion of the switching capacity. The proposed admission control further simplifies provisioning, because the network planners should only ensure that the aggregate transmission and reception capacities of users attached to some port do not exceed specified values, without having to estimate exact traffic pattern.

Scalable Scheduling Protocol and Agile Admission Control Protocol in the Case of Multicast Traffic We propose the following simple algorithm for adding a port to a forwarding tree, and removing a port from a forwarding tree.

Each port of a tree should store the parent (previous) port and children (next) ports. Each port should also store its branch fan-outs, where the branch fan-out is the number of ports that could be reached through that branch. A request for adding a port to the multicast group is sent to the tree root. It then travels through the tree, always taking the branch with the smallest fan-out. The fan-out of every branch that this request passes is increased by one, and the new port is added as a leaf to the tree (the port without children) at the end of the followed shortest path. Similarly, when a port wants to leave a tree it sends a request to the tree root. This request now travels through branches with the largest fan-outs until it gets to a leaf, and the fan-outs of these branches are decremented by one. The port to leave sends along with the request the information about its parent and children ports, and about its branch fan-outs, so that the chosen leaf would store these parameters. Then, this leaf port informs its parent to stop forwarding packets to it, and the parent of the port on leave to start forwarding packets to it. We believe that, in this way, minimal memory and processing per port are required for tree calculation and updates.

Figure 6:
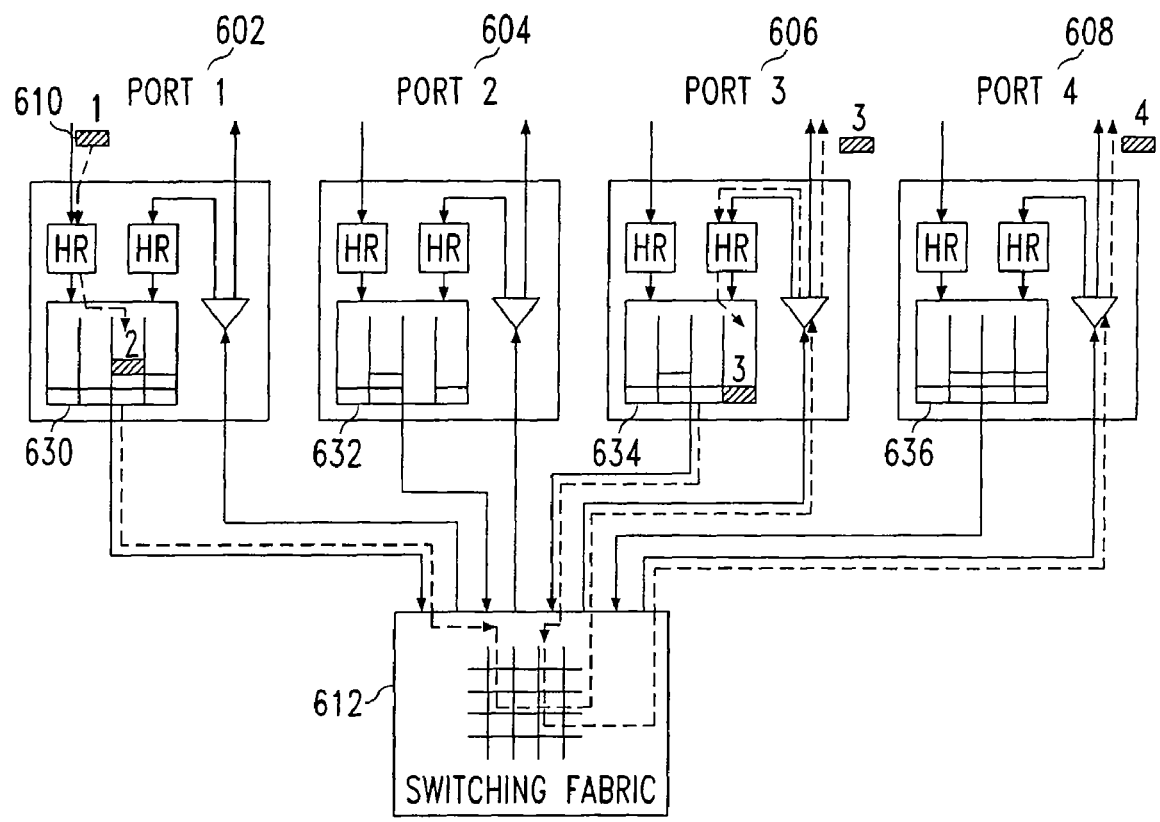
FIG. 6 is a schematic representation useful for understanding a multicast procedure in accordance with an embodiment of the present invention.
Figure 7:
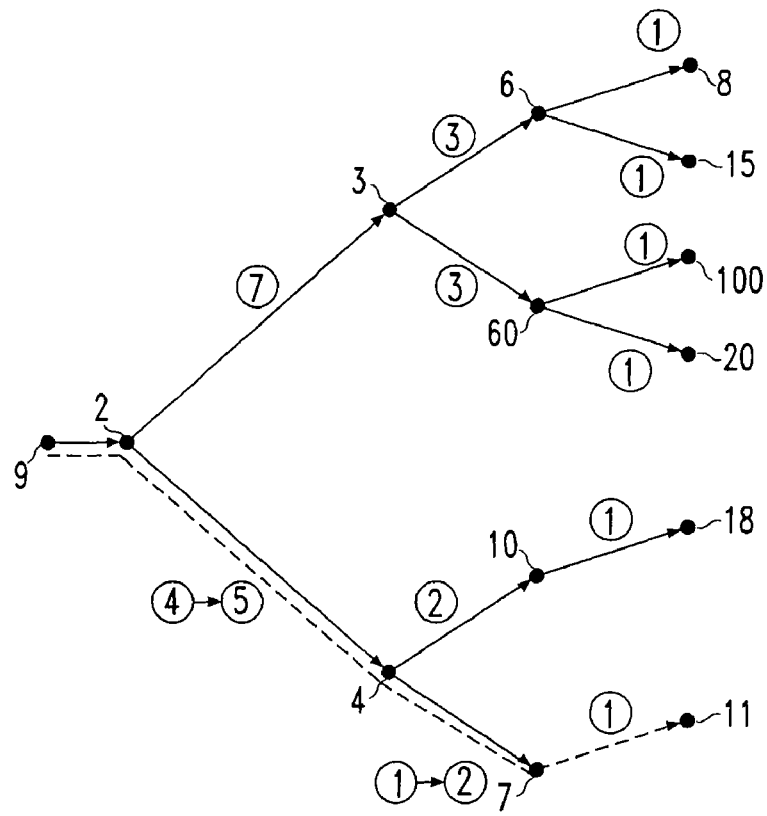
FIG. 7 is a schematic representation useful for describing how ports may be added to the multicast tree.
Figure 8:
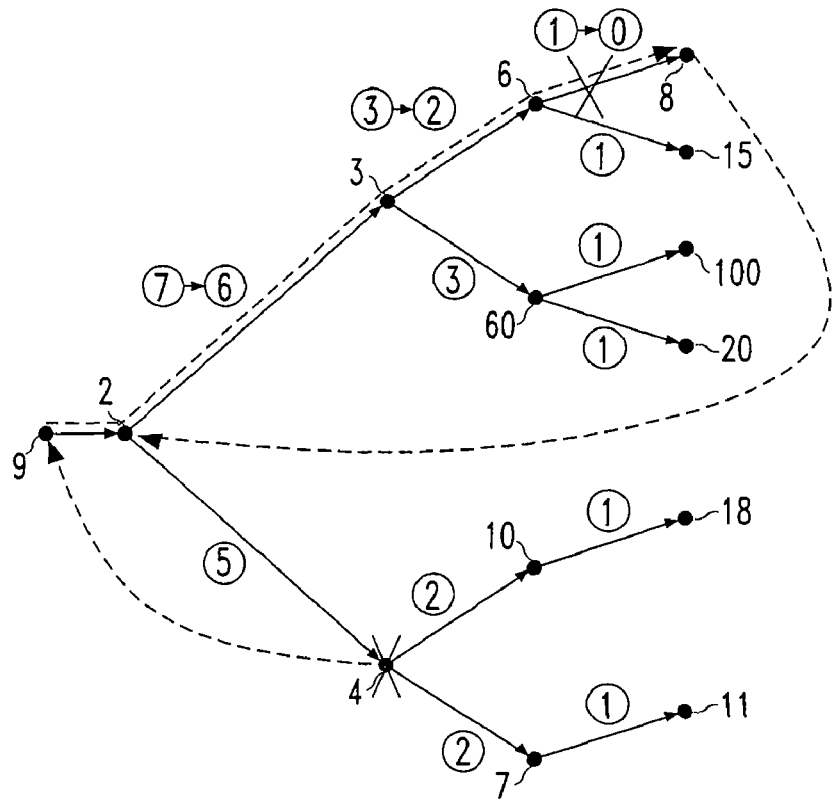
FIG. 8 is a schematic representation useful for describing how ports may be removed from the multicast tree.

FIG. 6 shows how a new port is added to the multicast group, while FIG. 7 shows how a port is removed from the multicast group. Both figures assume P=2. Dots in these directed graphs denote ports. Edges (branches) denote forwarding from port to port. The encircled branch fan-out denotes the number of ports reached by multicast packets using that branch. In FIG. 6 port 11 requests to join the multicast group. It sends the request to port 9, which is the multicast source and the tree root. This request is forwarded along the branches with the smallest fan-outs as shown by a dashed line. Branch fan-outs are updated as shown. The fan-out of branch from port 2 to port 4, i.e., branch 2-4, prior to the request was 4, while the fan-out of branch 2-3 was 7. Therefore port 2 determines that port 11 should be added to the subtree rooted at port 4. Then at node 4 the fan-out of branch 4-10 is 2, and the fan-out of branch 4-7 is 1, so node 4 selects to add port 11 after branch 4-7. Finally, node 11 is added as a child of node 7. All along the way the branch fan-out number is incremented along the selected path.

Conversely, in FIG. 7 port 4 requests to leave the multicast group. It sends the request to port 9. This request is forwarded along the branches with the largest fan-outs as shown by the dashed line starting at node 9, running through nodes 2, 3, and 6 and ending at node 8. The algorithm decrements branch fan-outs along described path and use a leaf at the end of the path to take the place of the departing node. Thus the figure shows the decrementing of the branch fan-outs along the path from node 2 to node 6. Port 8, which is the leaf, is chosen to replace port 4 which is leaving. Then node 8 is assigned to have node 2 as its parent and nodes 7 and 10 as its children. Port 8 informs port 2, the parent of port 4, that port 8 will replace port 4, so that port 2 can update its multicast table. Each port has to store only P ports and the corresponding fan-outs for each multicast session.

In the previous section we showed that the credits can be allocated to a new multicast session (i,n) if the following $|M_{in}|+1$ inequalities are fulfilled:

$$a_{in}^m + \sum_{1 \leq k \leq N} a_{ik} \leq \frac{F+1}{P+2}, \quad (11)$$

$$a_{in}^m + \sum_{1 \leq k \leq N} a_{kj} \leq \frac{F+1}{P+2}, \quad (12)$$

for $j \in M_{in}$. If the bandwidth is requested for a new multicast session, admission conditions (11, 12) are checked, and bandwidth is reserved accordingly. In the more general case, only a subset of multicast outputs have enough spare capacity, and they are admitted. Assume that the bandwidth is reserved for multicast session (i,n), and that the admitted multicast group of outputs is $M_{in}^a$. The tree is constructed out of the admitted multicast group according to the described algorithm. Assume that source i transmits packets to port p(i), and port j forwards packets to ports $p_k(j)$, $1 \leq k \leq P$. If new multicast session (i,n) is admitted, credits are updated like:

$$a_{ip(i)} \leftarrow a_{ip(i)} + a_{in}^m, \quad (13)$$

$$a_{jp_k(j)} \leftarrow a_{jp_k(j)} + a_{in}^m, \quad (14)$$

for j, $p_k(j) \in M_{in}^a$, $1 \leq k \leq P$.

Similarly, when the multicast session is released, the following updates are made:

$$a_{ip(i)} \leftarrow a_{ip(i)} - a_{in}^m, \quad (15)$$

$$a_{jp(j)} \leftarrow a_{jp_k(j)} - a_{in}^m, \quad (16)$$

for j, $p_k(j) \in M_{in}^a$, $1 \leq k \leq P$. It is also a realistic scenario that one or more ports request to join an already existing multicast session. They will be admitted if (12) is fulfilled and added to the tree as described. Credit allocation is done according to (14). Similarly, it may happen that some ports want to leave the multicast session. They are removed from the tree as described, and credit allocation is updated according to (16).

The admission of a multicast session can also be pipelined. In addition, the multicast session may be released in a pipelined fashion. Such pipelined admission control might better utilize the available bandwidth. For example, the bandwidth for a multicast session is reserved in one frame according to (13, 14), but packets are transmitted only to the first port of the forwarding sequence in the next frame. So, the bandwidth reserved for forwarding of these multicast packets to the rest of the ports is wasted because they have not arrived into the appropriate queues yet. In the case of the pipelined admission control, credits are allocated to the input for the transmission of packets to the first port in the multicast group within some frame, then the bandwidth for forwarding packets by this port should be reserved in the next frame (which is one frame after the bandwidth has been reserved for transmission from input), and so on. Similarly, when a multicast session has ended, the input will stop transmitting packets, but packets that were previously transmitted might still be forwarded by the switch ports. So, the bandwidth should be released according to (15, 16) $|M_{in}|$ frames after the termination of the multicast session. Alternatively, the bandwidth reserved for forwarding of multicast packets from the first port in a forwarding sequence should be released one frame after the bandwidth reserved for transmission from the multicast input has been released, and so on. The pipelined admission control can be summarized as follows: Input i reserves the bandwidth for transmission to port $j \in P_1 = \{p(i)\}$ by updating the assigned credits according to (13) and (14) in some frame t if conditions (11) and (12) for $j \in P_1$ hold. Then, port $j \in P_1$ reserves bandwidth for packet forwarding to ports $j \in P_2 = \{p_1(j), \ldots, p_1(j)\}$ for which conditions (12) hold, by updating the assigned credits according to (14) in frame t+1. In general, ports $j \in P_l$ reserve the bandwidth for packet forwarding to associated ports $j \in P_{l+1} = \{p_k(j) | j \in P_l, 1 \leq k \leq P\}$ for which conditions (12) hold, by updating the assigned credits according to (14) in frame t+1. Each port that reserves bandwidth in some frame stores port addresses from which it will receive packets, and also port addresses to which it will forward packets. This admission process lasts until the bandwidth is reserved for all ports with enough spare capacity. Similarly, if this multicast session ends in frame t, input i releases the bandwidth reserved for port p(i) in frame t, and ports $j \in P_1$, release bandwidth reserved for forwarding packets to their associated ports $j \in P_{l+1}$ in frame t+1.

At the beginning of each frame, counters associated with input-output pairs are set to their negotiated numbers of credits, $c_{ij} = a_{ij}$, $1 \leq i, j \leq N$. Packets are scheduled according to the previously described pipelined sequential greedy algorithm in which queues with positive counters are served with the priority.

Thus, the present invention provides an improved technique for conducting multicast operations which permits a more efficient and flexible use of high capacity switch resources. The technique spreads out the burden of multicasting among the members of the multicast group. Techniques employed in unicasting through such switches inform how the allocation of resources might be achieved.

The method provides for fast bandwidth reservations in high-capacity multicast switches. A set of input-output pairs to be connected in each time slot is determined according to the sequential greedy algorithm based on credits. Pipelined sequential greedy scheduling can be implemented in a switch with a large number of ports and high port bit-rate. Multicast packets are forwarded through ports to which they are bound. Namely, when some port receives a multicast packet, it will forward this packet to a small number of ports that have not received it yet. In this way, the transmission load of an input port is distributed over a number of ports that receive packets of the particular multicast session, so that the popularity of some content can vary arbitrarily in magnitude and over time without clogging ports. The implied admission controller has only to check if multicast input and outputs have enough spare capacity. Consequently, the network planning becomes very simple. It should be only planned that all users attached to some port transmit and receive data consuming the specified amount of bandwidth, while the traffic pattern between the ports can be arbitrary.

Reliability

When a port in the multicast group fails, all the ports belonging to the multicast subtree rooted at this port will not be receiving multicast packets, because the failed port will not be forwarding these packets. So, when a port fails, it should be replaced by some of the tree leaves in a way described earlier. However, the port is not aware of its failure in advance, so it cannot signal its leaving the multicast tree. With the port failure, its forwarding table might also become unavailable. For this reason, it would be further advantageous for a port to store not only its parent, children ports and branch fan-outs, but also, e.g., its grandparent (parent's parent), sibling (parent's children) ports and branch fan-outs of the parent port. For example, in FIG. 6, if this approach is adopted, port 10 stores its parent port 4, its child port 18, and the fan-out of branch 10-18 as before, but also its grandparent port 2, sibling port 7, and fan-outs of branches 4-7 and 4-10. In this way, when a port fails, and the failure is detected (e.g., by the children of that port) its children inform the root about this failure and send to the root information about the parent, children and branch fan-outs of the failed port, so that a chosen leaf port could replace the failed port in a forwarding tree in a manner similar to that described above with respect to FIG. 7. After this replacement, the new port would learn about its grandparent, sibling and branch fan-outs of the parent port by using a specified signaling procedure. In summary, each port should store 4·P+1 entries, P children ports, P branch fan-outs, 1 parent port, 1 grandparent port, P parent branch fan-outs, P−1 sibling ports.

In an alternative configuration, each port could store its grandchildren ports and its children branch fan-outs. When a port recognizes that its child port failed, it would inform the tree root and send the required information about this failed port (about its children and branch fan-outs). As before, some leaf port will replace the failed port, and it will learn from its children about its grandchildren and children branch fan-outs. In this case, each port should store 2·P·(P+1) entries. Signaling of the failure is somewhat simplified in this latter approach, because there is only one parent of a failed port that will inform the tree root, whereas in the former reliability enhancing scheme, all the children of the failed node would inform the tree root about the failure.

Protocol Extensions

Circuit Switches

Flexible multicasting could be similarly implemented in high-capacity circuit switches. Instead of packets, the circuits should be forwarded through a circuit switch. Each port receives the multicast information from one port through the established circuit and then transmits this information to multiple, P, ports through separately established circuits. Here, a circuit is a specified time slot within each frame which is assigned to some input-output pair for a certain period of time.

In the case of a greedy algorithm for the circuit establishment, bandwidth would be granted if the admission control conditions (5), (6) or (9) are fulfilled. Greedy algorithm is the one that does not change the previously established circuits.

The scheduling technique of the present invention can also be used for fast bandwidth reservations in high-capacity circuit switches. Instead of reserving an output for a single time slot in the future, an input reserves an output for a certain time slot of each frame. Afterwards, input also terminates the reservation. Unlike prior approaches, input modules must store the information about outputs reserved in each time slot of a frame. An input module also stores a table about its reserved output in each time slot of a frame. Moreover, the time slot duration can be very short in circuit switches, so that a selection takes multiple, e.g. r, time slots to be calculated. It follows that the bandwidth allocation can be changed in every r block of frames. Both bandwidth reservation and release are based on credits. At the beginning of a block of frames, each counter is loaded to the difference of the number of time slots newly assigned to the input-output pair, and the number of time slots released by this pair.

If the counter value is negative, an input-output pair releases its previously assigned time slot and increments the counter by one until it becomes zero. Otherwise, if the counter value is positive, an input-output pair reserves time slots in a frame and decrements the counter until its value is zero. As before, new bandwidth is allocated to some input-output pair if inequalities are fulfilled. Inputs sequentially release previously assigned time slots and then sequentially reserve admitted time slots, one after another. Pipelining can be applied. For example, input i releases an output r·(2N−i+1) time slots in advance, and reserves an output r·(N−i+1) time slots in advance. Input picks up output that has not been reserved in some of the previous blocks of frames, or by some of the previous inputs which reserve the outputs for the same time slot in the current block of frames. Note that each node would learn about all released and reserved outputs for some future time slot exactly r·N time slots after it releases or reserves an output for that time slot. So, the node can store the information in its tables before the next block of frames as long as rN≦rF, which is the case of interest. In conclusion, in an arbitrary block of frames, the scheduler accepts new bandwidth requests; in the next block of frames, it calculates a new time slot assignment; and finally in the third block of frames, the circuits are switched according to the new schedule. Of course, this process is also pipelined so that the switch time slot assignment can be changed at the beginning of each block of frames.

Bandwidth reservations through the switch can be replaced by provisioning enough bandwidth, and bandwidth reservations by source-destination pairs. Namely, if all sources and destinations attached to some port generate at maximum traffic that fulfills admission control condition (9), then source has only to check if its desired destination is available, i.e. does not already receive information from some other source; and if the destination is available, it acknowledges the bandwidth reservation to the source. Policing mechanisms could be placed at the network edge to limit the source transmission rates not to exceed their negotiated values.

Other Packet Switch Architectures

Flexible multicasting also can be implemented in switches with output or shared buffers that fully utilize internal port capacities. In a switch with output buffers, for example, in each time slot all packets bound for some output are stored simultaneously in its buffer. In a switch with a shared buffer, for example, in each time slot all packets at input ports are stored in the shared buffer. A controller determines their positions within the buffer based on their destination ports. In both architectures, the switch capacity can be limited by the buffer speed. In a switch with a shared buffer, the switch capacity might be also limited by the controller speed but the involved hardware is simpler. A high-capacity three-stage packet switch with full port utilization can be built out of switches with output or shared buffers. The described flexible multicasting by packet forwarding can be applied to any switch architecture.

The admission condition (1) can be generalized as:

$$T_i = \sum_{1 \leq k \leq N} a_{ik} \leq u(F+1), \quad (17)$$

$$R_i = \sum_{1 \leq k \leq N} a_{ki} \leq u(F+1),$$

for all ports i, $1 \leq i \leq N$, where u is the port utilization.

Consequently, the admission condition in a switch with forwarding becomes:

$$T_i + E_i \leq u(F+1), \quad (18)$$

for all ports i, $1 \leq i \leq N$.

Alternatively, the admission condition in a switch with forwarding can be expressed as:

$$T_i = \sum_{1 \leq k \leq N} a_{ik} \leq u\frac{F+1}{P+1}, \quad (19)$$

$$R_i = \sum_{1 \leq k \leq N} a_{ki} \leq u\frac{F+1}{P+1}, \quad (20)$$

for all ports i, $1 \leq i \leq N$.

What is claimed is:

1. A method of bandwidth reservations through a switch by employing counters associated with input-output queues, comprising:

loading a plurality of counters at a beginning of each frame of a length F to a negotiated number of credits, wherein said credit are allocated in the switch based on a maximal matching scheduling, to input-output pairs (i,j), if for $1 \leq i, j \leq N$, $$T_i + E_i + R_j \leq F+1$$

where $T_i$ is a number of credits allocated to input i within a frame, $E_i$ is a number of credits allocated to input i for packet forwarding within a frame, $R_j$ is a number of credits allocated to output j, F is a frame length, and N is a number of ports;

facilitating a competition for service by a plurality of queues with positive counters;

selecting a competing queue from said plurality of queues; and decrementing by one a counter of said plurality of counters associated with the competing queue that is selected.

2. The method of claim 1, wherein a bandwidth is allocated in the switch based on a maximal matching scheduling, to an input output pair (i,j) if for all ports i, $1 \leq i \leq N$, in accordance with:

$$T_i \leq F_t$$

$$R_i \leq F_r$$

$$F_t + (P+1) \cdot F_r = F+1$$

where $T_i$ is a number of credits allocated to input i, $R_i$ is a number of time slots per frame reserved for packets bound to output i, P is a number of ports to which a given port will forward a packet, F is a frame length and N is a number of ports.

3. The method of claim 1, wherein a bandwidth is allocated in the switch based on a maximal matching scheduling, to input/output pairs (i, j) $1 \leq i, j \leq N$, if for all ports i, $1 \leq i \leq N$, in accordance with:

$$T_i \leq \frac{F+1}{P+2}$$

and $$R_i \leq \frac{F+1}{P+2}$$

where $T_i$ is a number of credits allocated to input i, $R_i$ is a number of time slots per frame reserved for packets bound to output i, P is a number of ports to which a given port will forward a packet, F is a frame length, and N is a number of ports.

4. The method of claim 1, wherein a source reserves a bandwidth through the switch based on a maximal matching scheduling, only by communication with a particular destination if one of the following conditions applies:

$$T_i \leq F_t;\; R_i \leq F_r;\; F_t + (P+1) \cdot F_r = F+1 \quad 1 \leq i \leq N$$

or $$T_i \leq \frac{F+1}{P+2};\; R_i \leq \frac{F+1}{P+1} \quad 1 \leq i \leq N$$

where $T_i$ is a total number of packets per frame that users connected to input i are able at most to transmit due to their individual transmission capacities, $R_i$ is a total number of packets per frame that users connected to output i are able at most to receive due to their individual reception capacities, P is a number of ports to which a given port will forward a packet, and N is a number of ports.

5. The method of claim 1, wherein a source reserves a bandwidth through the switch based on a maximal matching scheduling, only by communication with the particular destination if one of the following conditions applies:

$$t_i \leq f_t;\; r_i \leq f_r;\; f_t + (P+1) \cdot f_r = 1 \quad 1 \leq i \leq N$$

or $$t_i \leq \frac{1}{P+2};\; r_i \leq \frac{1}{P+2} \quad 1 \leq i \leq N$$

where $t_i$ is a portion of the port capacity that users connected to input i are able at most to transmit due to their individual transmission capacities, $r_i$ is a portion of the port capacity that users connected to output i are able at most to receive due to their individual reception capacities, P is a number of ports to which a given port will forward a packet, and N is a number of ports.

6. A method of bandwidth reservations through a switch by employing counters associated with input-output queues, comprising:

loading a plurality of counters at a beginning of each frame of a length F to a negotiated number of credits, wherein the switch is fully utilized, and said credits are allocated in the switch, to input-output pairs (i,j), if $1 \leq i, j \leq N$, $$T_i + E_i \leq F+1$$

where $T_i$ is a number of credits allocated to input i within a frame, $E_i$ is a number of credits allocated to input i for packet forwarding within a frame, F is a frame length, and N is a number of ports;

facilitating a competition for service by a plurality of queues with positive counters;

selecting a competing queue from said plurality of queues; and decrementing by one a counter of said plurality of counters associated with the competing queue that is selected.

* * * * *